United States Patent
Alanen et al.

(10) Patent No.: US 9,860,926 B2
(45) Date of Patent: Jan. 2, 2018

(54) NETWORK DISCOVERY IN WIRELESS NETWORK

(75) Inventors: Olli Alanen, Vantaa (FI); Jarkko Kneckt, Espoo (FI)

(73) Assignee: Nokia Technologies Oy, Espoo (FI)

( * ) Notice: Subject to any disclaimer, the term of this patent is extended or adjusted under 35 U.S.C. 154(b) by 286 days.

(21) Appl. No.: 14/396,133

(22) PCT Filed: Apr. 25, 2012

(86) PCT No.: PCT/FI2012/050408
§ 371 (c)(1),
(2), (4) Date: Oct. 22, 2014

(87) PCT Pub. No.: WO2013/160523
PCT Pub. Date: Oct. 31, 2013

(65) Prior Publication Data
US 2015/0334751 A1     Nov. 19, 2015

(51) Int. Cl.
*H04W 76/02*     (2009.01)
*H04W 48/16*     (2009.01)
(Continued)

(52) U.S. Cl.
CPC ......... *H04W 76/021* (2013.01); *H04W 48/16* (2013.01); *H04W 74/0808* (2013.01);
(Continued)

(58) Field of Classification Search
CPC ............... H04W 48/16; H04W 76/021; H04W 74/0808; H04W 76/02; H04W 88/02; H04W 84/12
See application file for complete search history.

(56) References Cited

U.S. PATENT DOCUMENTS

2009/0075653 A1*   3/2009   Yeom ................... H04W 72/02
                                                                     455/434
2010/0202411 A1    8/2010   Mo et al.
(Continued)

FOREIGN PATENT DOCUMENTS

EP              2330864 A2     6/2011
WO    WO 2011/106538 A1    9/2011
(Continued)

OTHER PUBLICATIONS

Phillip Barber et al. *Broadcast Probe Response* IEEE SA Mentor; 11-11-1500-00-00AI-Broadcast-Probe-Response, IEEE-SA Mentor, Piscataway, NJ, USA, vol. 802.11ai, Nov. 7, 2011, pp. 1-10, XP068037825.
(Continued)

*Primary Examiner* — Jae Y Lee
(74) *Attorney, Agent, or Firm* — Harrington & Smith

(57) ABSTRACT

Methods, apparatuses, and computer programs are presented for operation during a network discovery process of a scanning device attempting to detect presence of wireless networks. During the network discovery process, the scanning device itself may transmit scanning messages by using duplicate transmission in which multiple scanning messages are transmitted simultaneously on different channels. According to another aspect, a wireless apparatus of a wireless network may transmit scanning messages by using the duplicate transmission to facilitate the detection of the wireless network by the scanning device.

17 Claims, 5 Drawing Sheets

(51) Int. Cl.
  *H04W 74/08* (2009.01)
  *H04W 88/02* (2009.01)
  *H04W 84/12* (2009.01)
(52) U.S. Cl.
  CPC .......... *H04W 76/02* (2013.01); *H04W 84/12* (2013.01); *H04W 88/02* (2013.01)

(56) References Cited

U.S. PATENT DOCUMENTS

| | | | | |
|---|---|---|---|---|
| 2011/0194542 A1 | | 8/2011 | Kim et al. | 370/338 |
| 2012/0051293 A1* | | 3/2012 | Sakoda | H04W 72/046 370/328 |
| 2012/0177017 A1* | | 7/2012 | Gong | H04W 74/0816 370/338 |
| 2013/0176897 A1* | | 7/2013 | Wang | H04W 12/06 370/254 |

FOREIGN PATENT DOCUMENTS

| | | |
|---|---|---|
| WO | WO 2011/135392 A1 | 11/2011 |
| WO | WO 2012/051151 A1 | 4/2012 |

OTHER PUBLICATIONS

Jarkko Kneckt (Nokia): *Active Scanning;* IEEE SA Mentor; 11-11-1619-03-00AI-Active-Scanning, IEEE-SA Mentor, Piscataway, NJ, USA, vol. 802.11ai, No. 3, Jan. 19, 2012, pp. 1-15, XP068038006.

IEEE Std. 802.11ac™-2013, "Part 11: Wireless LAN Medium Access Control (MAC) and Physical Layer (PHY) Specifications, Amendment 4: Enhancements for Very High Throughput for Operation in Bands below 6 GHz", 425 pgs.

IEEE P802.11n™/D7.0, "Draft Standard for Information Technology—Telecommunications and information exchange between systems—Local and Metropolitan area networks—specific requirements, Part 11: Wireless LAN Medium Access Control (MAC) and Physical Layer (PHY) specifications, Amendment 5: Enhancements for Higher Throughput", © 2008 by the IEEE, 556 pgs.

* cited by examiner

NETWORK DISCOVERY IN WIRELESS NETWORK

FIELD

The invention relates to the field of wireless communications and, particularly, to network discovery in a wireless communication system.

BACKGROUND

A terminal device of a wireless communication system may be configured to scan for available communication channels before initiating a link setup with an access point or another terminal device of a wireless network. A fast scanning procedure expedites the link setup.

BRIEF DESCRIPTION

The invention is defined by appended independent claims.
Embodiments of the invention are defined in dependent claims.

LIST OF DRAWINGS

Embodiments of the present invention are described below, by way of example only, with reference to the accompanying drawings, in which FIGS. 1A and 1B illustrate an example of a wireless communication system to which embodiments of the invention may be applied;

DESCRIPTION OF EMBODIMENTS

The following embodiments are examples. Although the specification may refer to "an", "one", or "some" embodiment(s) in several locations, this does not necessarily mean that each such reference is referring to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1A:
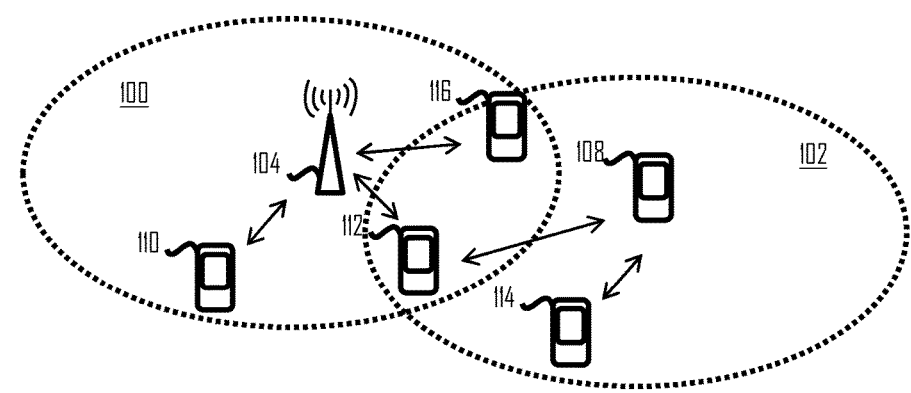

A general architecture of a wireless telecommunication system to which embodiments of the invention may be applied is illustrated in FIG. 1A. FIG. 1A illustrates two groups of wireless communication devices forming two basic service sets, e.g. groups of wireless communication devices comprising an access point (AP) 104, 108 and terminal stations (STA) 110, 112, 114, 116 communicating with the access points 104, 108 of their respective groups. A basic service set (BSS) is a basic building block of an IEEE 802.11 wireless local area network (WLAN). The most common BSS type is an infrastructure BSS that includes a single AP, e.g. the AP 104, together with all associated STAs, e.g. STAs 110, 112, 116. The AP may be a fixed AP as AP 104, or it may be a mobile AP as AP 108. The APs 104, 108 may also provide access to other networks, e.g. the Internet. In another embodiment, at least one of the BSSs is an independent BSS (IBSS) or a mesh BSS (MBSS) without a dedicated AP, and in such embodiments the devices 104, 108 may be a non-access-point terminal stations. While embodiments of the invention are described in the context of the above-described topologies of IEEE 802.11 and, particularly, IEEE 802.11ac and IEEE 802.11ai, it should be appreciated that these or other embodiments of the invention may be applicable to networks based on other specifications, e.g. other versions of the IEEE 802.11, WiMAX (Worldwide Interoperability for Microwave Access), UMTS LTE (Long-term Evolution for Universal Mobile Telecommunication System), and other networks having cognitive radio features, e.g. transmission medium sensing features and adaptiveness to coexist with radio access networks based on different specifications and/or standards. Some embodiments may be applicable to networks having features under development by IEEE 802.19 task group.

Figure 1B:
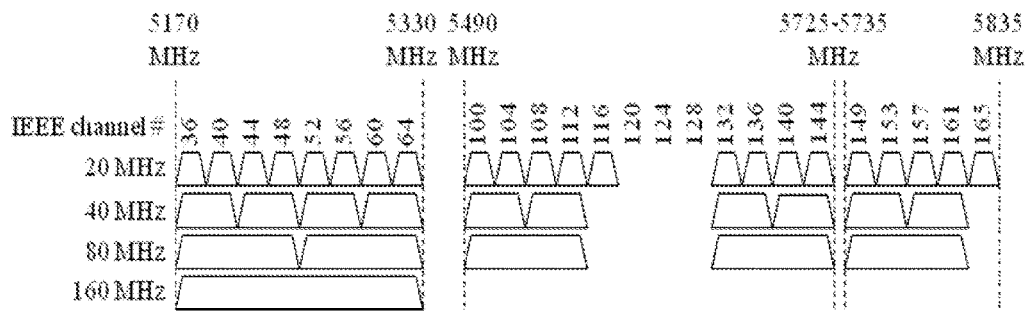

IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. FIG. 1B illustrates an exemplary channel structure for 20 MHz, 40 MHz, 80 MHz, and 160 MHz channels. In this example, a 40 MHz transmission band is formed by two contiguous 20 MHz bands, and an 80 MHz transmission band is formed by two contiguous 40 MHz bands. However, a 160 MHz band may be formed by two contiguous or non-contiguous 80 MHz bands.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Every device attempting to gain a TXOP is reducing a backoff value while the primary channel is sensed to be idle for a certain time interval, for instance 9 microseconds. When the backoff value reaches zero, the STA gains the TXOP and starts transmission. If another STA gains the TXOP before that, the backoff value computation may be suspended, and the STA continues the backoff computation after the TXOP of the other STA has ended and the primary channel is sensed to be idle. The time duration (the backoff value) may not be decremented during the TXOP of the other STA, but the time duration that already lapsed before the suspension may be maintained, which means that the device now has a higher probability of gaining the TXOP. A secondary channel may be used in the transmission if it has been free for a determined time period (may be the same or different time period than that used for gaining the TXOP) just before TXOP start time in order for the contending device to take the secondary channel in use.

Some IEEE 802.11 networks utilize an enhanced version of the CSMA/CA where prioritized transmissions are taken into account. An example, of such an enhanced CSMA/CA is enhanced distributed channel access (EDCA) where the backoff value and a contention window (a time period when the channel contention is carried out) are selected to prioritize access classes having a higher priority, e.g. a higher quality-of-service classification. The EDCA is also carried out on the primary channel, and a STA winning the contention may expand the transmission band to the secondary channel(s) if the secondary channel(s) have been sensed to be available, e.g. through clear-channel assessment (CCA) for a determined time period, e.g. a point coordination function inter-frame space (PIFS) duration before the start of the TXOP.

A virtual carrier sensing function is provided by the provision of a network allocation vector (NAV) which is used to reserve a channel for the duration of the TXOP. Most of the transmitted frames comprise a duration field which can be used to reserve the medium, or provide duration of the NAV protection, for the duration indicated by the value of the duration field. In practice, the NAV is a timer that indicates the amount of time the medium will be reserved. In a typical operation, the transmitting and receiving stations (STAs) will set the NAV to the time for which they expect to use the medium while other STAs count down from the NAV to zero before starting the channel contention. The virtual carrier sensing function indicates that the medium is busy when NAV is non-zero and idle when NAV is zero. The NAV may be set to protect frame transmissions. The communication devices obtain the NAV on the primary channel of the BSS.

IEEE 802.11ai task group is creating principles for fast initial link setup (FILS). One aspect of the principles is to enable faster and more precise AP and network discovery. Some principles relate to passive scanning in which a scanning device, e.g. a STA, passively scans channels for any beacon, management, or advertisement frames. Other principles relate to active scanning in which the scanning device actively transmits a scanning request message, e.g. a Probe Request message or a generic advertisement service (GAS) request, in order to query for present APs or networks. The probe request may also set some conditions that a responding device should fulfill in order to respond to the probe request. In some embodiments, the scanning device may be called a requesting device or a requesting apparatus. Responding devices may transmit scanning response messages, e.g. Probe Response messages, in response to the scanning request message, wherein the scanning response message may contain information on the responding device, its network, and other networks. Embodiments of the scanning enhancements described herein encompass the network discovery signalling, probe request-response processes, as well as GAS request-response processes.

Some embodiments of the invention relate to duplicate transmission of scanning messages used for providing information on present wireless networks to enable scanning devices to start link setup procedures for data transfer. The scanning messages may relate to network discovery preceding the link setup. The scanning device may be in an unauthenticated state or unassociated state or preparing for a reassociation. An unassociated state may be understood to refer to an idle mode where the scanning device has no connection with any wireless network. The preparation for the reassociation may be understood to refer to a situation where the scanning device is associated or has a connection with one wireless network but is searching for another wireless network for handover purposes or for creating a second, parallel link. It should be appreciated that there are other scenarios in which the scanning device carries out network discovery procedures.

Figure 2:
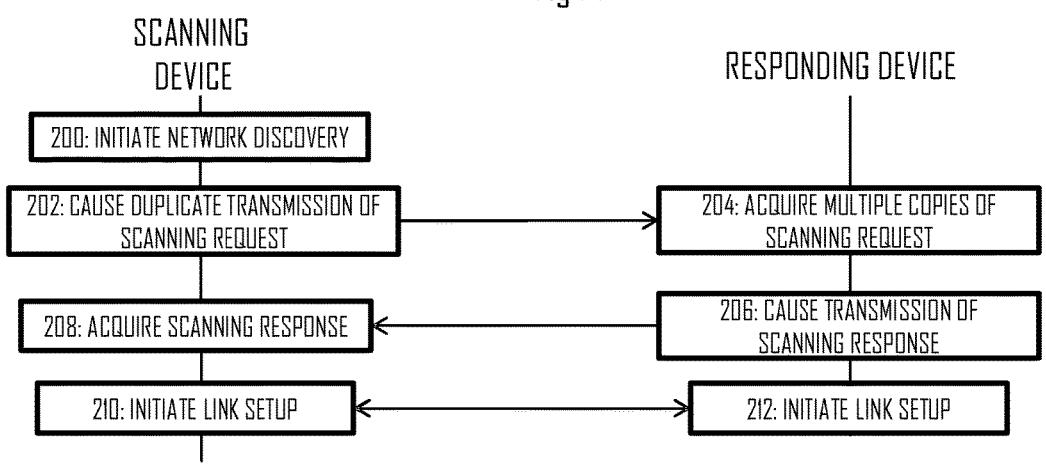
FIG. 2 illustrates a signalling diagram of a network discovery process according to an embodiment of the invention.

FIG. 2 illustrates a signalling diagram of an embodiment of the utilization of the duplicate transmission of the scanning messages. Referring to FIG. 2, a scanning device, e.g. a STA 112, initiates a network discovery procedure in block 200 in order to determine the wireless networks present in its current location. In block 202, the scanning device causes transmission of a plurality of copies of a scanning request message simultaneously on different channels. The copies of the scanning request messages may be mutually identical, they may have identical transmission timings, and they may be transmitted on different frequency channels.

In block 204, a responding device, e.g. an AP 104 and/or 108, acquires the plurality of copies of the scanning request message that are originated from the scanning device and transferred simultaneously over the different channels. In an embodiment, block 204 comprises reception of the plurality of copies of the scanning request message from the different channels. In another embodiment, block 204 comprises acquiring the contents of the plurality of copies of the scanning request message from a memory unit and acquiring either explicit or implicit information that the plurality of copies of the scanning request message were transferred simultaneously on different channels. In block 206, the responding device is configured to transmit at least one scanning response message to the scanning device. Embodiments of block 206 are described below.

The scanning device acquires the scanning response message(s) in block 208. In an embodiment, block 208 comprises reception of the scanning response message(s) on at least one channel. In another embodiment, block 208 comprises acquiring the contents of the scanning response message(s) from a memory unit and acquiring either explicit or implicit information on the channel(s) on which the scanning response message(s) were transferred. The scanning device may acquire in block 208 scanning response messages from different responding devices in response to the transmission of the multiple copies of the scanning request message in block 202.

After gathering information on the present wireless networks during the network discovery procedure (blocks 200 to 208), the scanning device selects one of the discovered wireless networks and initiates a link setup with the responding device of the wireless network in block 210. In blocks 210 and 212, the scanning device and the responding device carry out the link setup procedures in mutual cooperation. The link setup procedures may comprise authenticating the scanning device and associating the scanning device for frame transmission in the wireless network of the responding device.

Configuring the scanning device to apply an active scanning procedure or an active network discovery procedure in which it transmits multiple copies of the scanning request message simultaneously on parallel channels expedites the network discovery. Advantages include faster link setup, faster handovers and reduction in power consumption.

Let us now describe some embodiments of the procedure of FIG. 2 with reference to FIGS. 3 to 8. Let us assume in this example an 80 MHz band comprising a primary channel and a plurality of secondary channels, as shown in FIGS. 3 to 8. The channels may be adjacent channels in a frequency domain. The primary channel may be the primary channel of a wireless network of the responding device.

Figure 3:
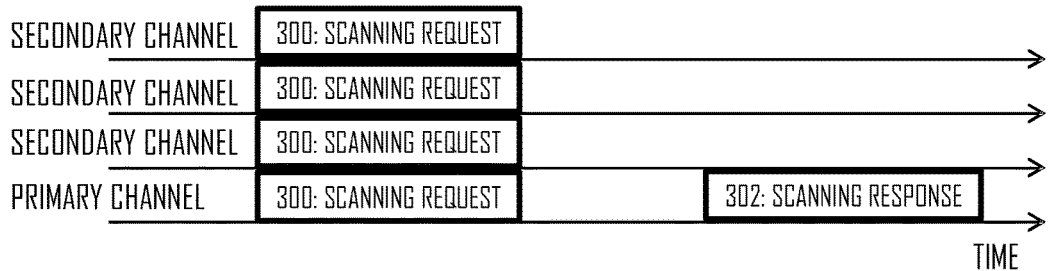
FIGS. 3 to 8 illustrate embodiments for duplicate transmission of scanning messages.

Referring to the embodiment of FIG. 3, the scanning device is configured to transmit the scanning request message 300 as a duplicate transmission such that a plurality of copies of the scanning request message 300 is transmitted simultaneously on the primary channels and a plurality of secondary channels, on three secondary channels in this example. In this embodiment, the scanning device may first determine the channels the wireless network is using, e.g. on the basis of information gathered through passive scanning or through CCA, and then transmit a copy of the scanning request message 300 on all the channels of the wireless network. The scanning device may be configured to insert the plurality of copies of the scanning request message as medium access control management packet data units (MMPDUs) into a single physical layer convergence protocol packet data unit (PPDU). As a consequence, the plurality of copies of the scanning request message may be understood as being comprised in the same PPDU. According to a viewpoint, each copy of the scanning request message forms a low-bandwidth MMPDU within a high-bandwidth PPDU. For example, each MMPDU may have a bandwidth of 20 MHz, while the bandwidth of the PPDU may be 80 MHz according to the example of FIG. 3.

In an embodiment, such a PPDU comprising the plurality of copies of the same MMPDU is called a non-very-high-throughput (non-VHT) duplicate PPDU.

In an embodiment, a PPDU comprising the plurality of copies of the same scanning request message is called a non-VHT duplicate FILS request frame.

The responding device may be configured to respond to the plurality of copies of the scanning request message by transmitting a single scanning response message 302 only on the primary channel of the wireless network. In this embodiment, the duplicate transmission is applied to the scanning request messages but not to the scanning response messages.

Figure 4A:
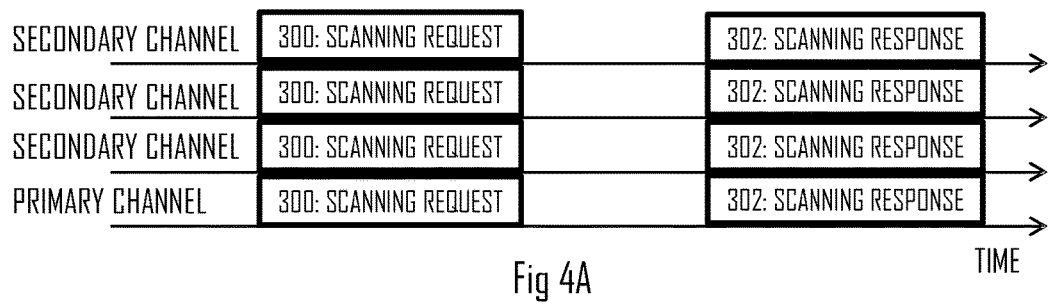

Referring to the embodiment of FIG. 4A, the scanning device may again be configured to transmit the copies of the scanning request message 300 as a duplicate transmission simultaneously on the primary channel and the secondary channels, e.g. on the whole bandwidth of the wireless network as detected by the scanning device. In this embodiment, however, the responding device is configured to respond to the each copy of the scanning request message it is able to detect. As a consequence, the responding device may be configured to transmit a copy of the scanning response message on all the channels on which it has detected a scanning request message. For example, if the responding device detects the scanning request message only on its primary channel, it will respond with a single scanning response message, but if the responding device detects the multiple copies of the scanning request message on different channels, it will respond with multiple scanning response messages, as described herein. The responding device may be configured to extract the contents of the scanning request message, determine whether or not it is obliged to respond to the scanning request message. If the responding device is obliged to respond to the scanning request message, it may determine on which channels a copy of the scanning request message was received and, then, transmit a copy of the scanning response message on each channel as the duplicate transmission.

Figure 4B:
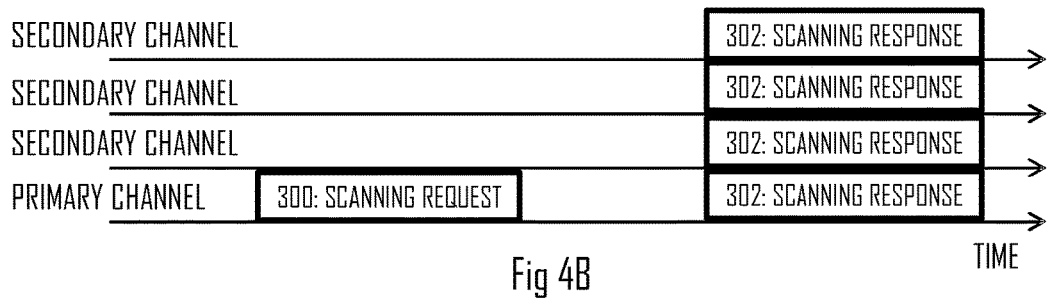

In the embodiment of FIG. 4B, the responding device acquires a single scanning request message 300. This may be the result that the scanning device has transmitted only a single copy of the scanning request message or that the scanning device has transmitted multiple copies of the scanning request message but that the responding device has detected only one of the copies. Referring to FIG. 4B, the responding device is configured to respond to the detected single copy of the scanning request message 300 by transmitting the scanning response message 302 as the duplicate transmission on a plurality of channels. The multiple copies of the scanning response message 302 may be transmitted on at least the primary channel and simultaneously on one or more secondary channels. In an embodiment, the responding device is configured to transmit the multiple copies of the scanning response message 302 on all of its operative channels.

As was with the scanning request message, the responding device may be configured to insert the plurality of copies of the scanning response message as medium access control management packet data units (MMPDUs) into a single physical layer convergence protocol packet data unit (PPDU). As a consequence, the plurality of copies of the scanning response message may be understood as being comprised in the same PPDU. Each copy of the scanning response message may be considered to form a low-bandwidth MMPDU within a high-bandwidth PPDU. For example, each MMPDU may have a bandwidth of 20 MHz, while the bandwidth of the PPDU may be 80 MHz according to the example of FIG. 4. The PPDU may be called the non-VHT duplicate PPDU.

In an embodiment, a PPDU comprising the plurality of copies of the same scanning response message is called a non-VHT duplicate FILS response frame.

In the embodiments of FIGS. 3 and 4, the scanning device first determines the primary channel of the wireless network and, then, transmits the copies of the scanning request messages 300 on the operative channels of the wireless network. In an embodiment, the scanning device determines the primary channel by passively scanning a plurality of channels for a determined duration, e.g. a probe duration of 5 milliseconds, and determines that a primary channel is a channel which is detected to be busy during the determined duration. The scanning device may stop channel scanning and transmit scanning request as soon as it detects a channel to be busy. In another embodiment, the scanning device may continue to scan for the whole probe duration, or for a shortened probe duration.

The scanning device may assess the reception power, the transmission bandwidth and the type of the received signal. The scanning device may try to estimate the channels occupied by the APs providing the highest signal quality as well as to assess a maximum bandwidth in which the scanning request frame will be received by the AP with sufficient reception power to be received correctly. If the received signals are estimated to be too weak, the scanning device may transmit smaller bandwidth requests in order to detect also the BSSs with low signal strength.

Figure 5:
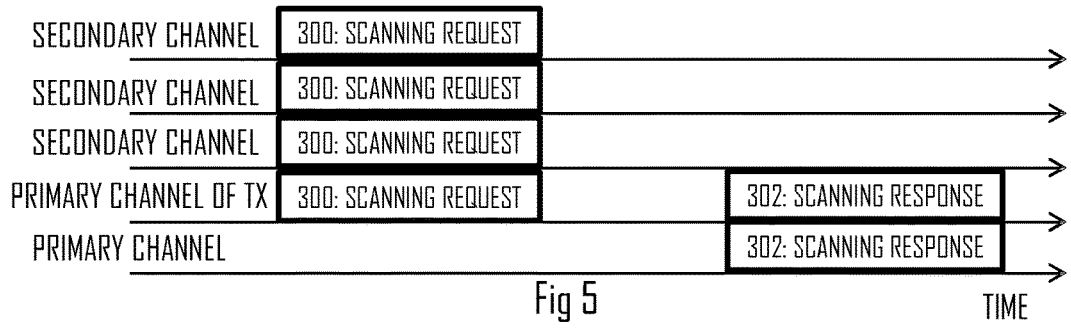

If a plurality of channels is detected to be busy, the scanning device may send scanning message on all channels that were detected to be busy to request responses for the scanning request message. The scanning device needs not to detect the primary channel, just send a scanning request to all channels that were detected busy. In the embodiments, of FIGS. 3 and 4, the scanning device is able to detect the primary channel and the secondary channels of the wireless network correctly and, therefore, it transmits the copies of the scanning request message 300 on appropriate channels. However, sometimes the scanning device may determine the operative channels incorrectly or it may transmit the scanning request messages without first considering the channel structure of the wireless network. As a consequence, the scanning device may transmit the duplicate transmission of the scanning request messages 300 only partially on the operative channels of the wireless network, as shown in FIG. 5. Referring to FIG. 5, the scanning device may determine a primary channel of transmission for the scanning request messages, wherein the primary channel of transmission is different from the primary channel of the wireless network. In this example, the primary channel of transmission may be a secondary channel of the wireless network, or it may even be outside the operative channels of the wireless network. At least one of the copies of the scanning request message 300 may, however, be transmitted on at least one of the operative channels of the wireless network.

Upon detecting at least one of the copies of the scanning request message 300 on at least one of the operative channels of the wireless network, the responding device may be configured to determine whether or not a copy of the scanning request message 300 was received on the primary channel of the wireless network. As shown in FIG. 5, let us assume that none of the copies of the scanning request message was received on the primary channel of the wireless network. In response to not receiving the scanning request message 300 on the primary channel, the responding device may be configured to determine the primary channel of transmission of the scanning device. The responding device may determine the primary channel of transmission from the contents of the scanning request message(s), wherein the scanning request message may contain an information element explicitly indicating the primary channel of transmission. In another embodiment, the responding device may determine the primary channel of transmission implicitly from the format or pattern of the scanning request messages 300, e.g. the primary channel of transmission may be determined to be a channel on which a copy of the scanning request message 300 was received and which has the lowest or the highest channel index number. Upon determining the primary channel of transmission, the responding device may be configured to transmit the scanning response message 302 as the duplicate transmission such that one copy of the scanning response message 302 is transmitted on the primary channel of transmission and one copy of the scanning response message is transmitted on the primary channel of the wireless network, as shown in FIG. 5.

If a copy of the scanning request message 300 was received by the responding device on the primary channel of the wireless network, the responding device may determine whether the primary channel of transmission is the same as or different from the primary channel of the wireless network. If the primary channels are the same, the responding device may operate according to the embodiment of FIG. 3 and transmit only a single copy of the scanning response message 302 on the primary channel. However, if the primary channels are different, the responding device may be configured to still transmit a copy of the scanning response message 302 on the primary channel of the wireless network and on the primary channel of transmission of the scanning request message(s) 300.

Figure 6:
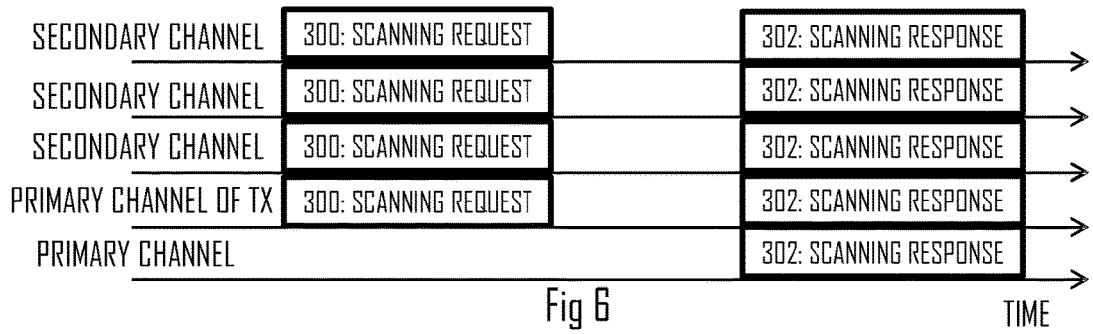

The embodiment of FIG. 6 is a combination of embodiments of FIGS. 4 and 5. In the embodiment of FIG. 6, the primary channel of transmission of the scanning device is different from the primary channel of the wireless network, and the scanning device does not transmit a copy of the scanning request message on all the operative channels of the wireless network, e.g. not on the primary channel of the wireless network. In an embodiment, the responding device is configured to transmit a copy of the scanning response message 302 on all the channels on which a copy of the scanning request message was received and, additionally a copy of the scanning response message 302 at least on the primary channel of the wireless network. In another embodiment, the responding device is arranged to transmit a copy of the scanning response message 302 on all the channels on which a copy of the scanning request message was received and, additionally a copy of the scanning response message 302 on all the operative channels of the wireless network.

The scanning request message 300 described above in connection with the duplicate transmission may be at least logically different from a probe request message of IEEE 802.11 networks. In an embodiment, the scanning request message 300 used as the plurality of copies in the duplicate transmission is called a FILS request message. The FILS request message may thus have a message identifier different from the message identifier of the probe request. In an embodiment, the FILS request also contains at least one additional information element. An embodiment of the additional information element defines a service set identifier (SSID) having a value that addresses the FILS request frame to IEEE 802.11ai capable devices. The SSID may be used to define what types of devices should respond or what type of wireless networks the scanning device is searching for. Another embodiment of the additional information element may indicate the primary channel of transmission, and the information element may have the following format:

TABLE 1

| Element ID | Length | Channel Number of Primary Channel of TX |
|---|---|---|
| 1 octet | 1 octet | 1 octet |

The Element identifier (ID) may denote the information element and thus have a unique value. The Length field may indicate the length of the Channel Number element in octets and it may be set to "1" when the length of the Channel Number element is one. The Channel Number of the Primary Channel of Transmission may explicitly indicate the channel index number of the primary channel of transmission or the primary channel of the scanning device.

Figure 7A:
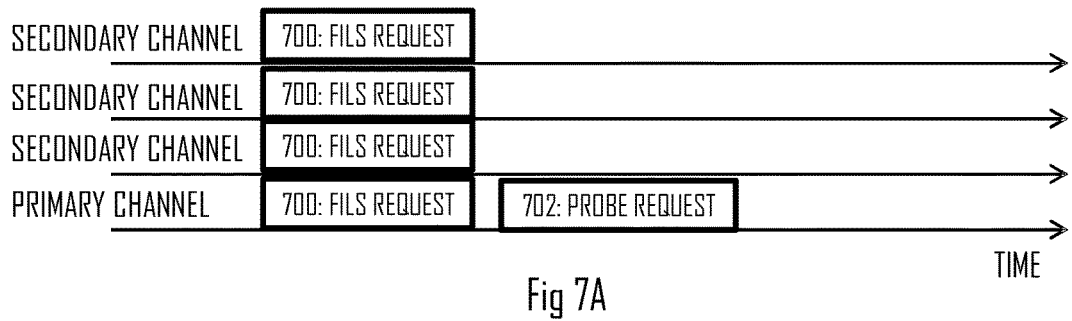

Let us now consider an embodiment of the scanning device which supports a communication protocol version specifying the FILS request scheme and a different communication protocol version specifying only the conventional probe request scheme. FIG. 7A illustrates an embodiment of the active scanning by such a scanning device. In this embodiment, the scanning device is arranged to transmit the FILS request messages to expedite the scanning and to solicit FILS-capable responding devices to respond and, additionally, the scanning device is arranged to transmit the probe request frames that solicits the non-FILS-capable devices to respond. This scheme both expedites the network discovery and increases the number of responding devices.

In an embodiment, the scanning device is arranged to transmit the probe request message in connection with the duplicate transmission of the FILS request message. As a consequence, the transmission of one request message triggers the transmission of the other request message. In the embodiment of FIG. 7A, the scanning device first transmits the duplicate transmission of the FILS request message 700 by transmitting a copy of the FILS request message simultaneously on different channels. After expiry of a guard interval after the FILS request, e.g. a short inter-frame space (SIFS), the scanning device is configured to transmit the probe request message 702 on the primary channel of transmission.

In another embodiment, the transmission order of the FILS request and the probe request is reversed such that the probe request message 702 is transmitted before the duplicate transmission of the FILS request message 700.

In yet another embodiment, the procedure of FIG. 7A is carried out such that a the FILS request message has substantially the same contents as a GAS request, and a conventional GAS request is transmitted in connection with the FILS request message.

In still another embodiment, the scanning device may be configured to transmit a FILS request as the duplicate transmission on a first set of channels and a probe request on a second set of channels at least partially different from the first set. The first and second set may have completely different channels. For example, the scanning device may transmit a FILS Request as the duplicate transmission on the first set of channels, e.g. four channels to cover an 80 MHz bandwidth, and to solicit responses from 802.11ac and 802.11ai capable devices operating on at least one of those channels. If a wireless network suitable for the link setup is not discovered during the FILS request procedure, the scanning device may transmit the probe requests on the second set of channels covering the remaining channels.

Figure 7B:
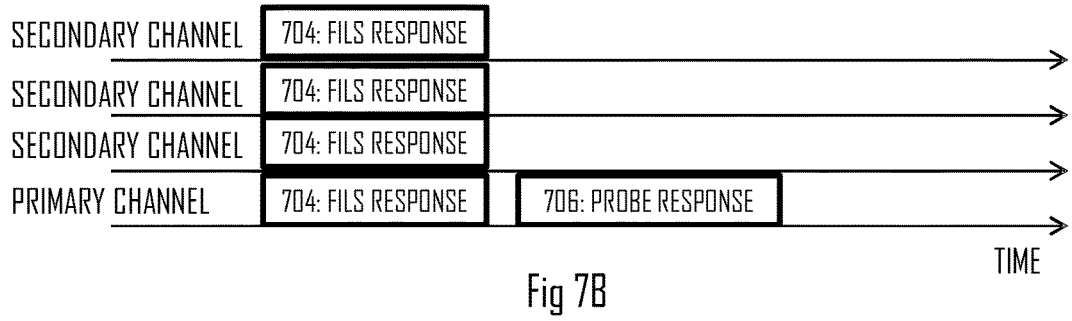

Similarly, the responding device may be configured to transmit the probe response message in connection with the duplicate transmission of the FILS response message as a response to the probe request or FILS request message. With reference to FIG. 7B, the transmission of one response message triggers the transmission of the other response message. The responding device may first transmit the duplicate transmission of the FILS response message 704 by transmitting a copy of the FILS response message 704 simultaneously on different channels. After expiry of a guard interval after the FILS response, e.g. a short inter-frame space (SIFS), the responding device is configured to transmit the probe response message 706 on the primary channel of the responding device.

In another embodiment, the transmission order of the FILS response 704 and the probe response 706 is reversed such that the probe response message 706 is transmitted before the duplicate transmission of the FILS response message 704.

In an embodiment, the scanning device first determines the number of channels on which to transmit scanning request messages. The number of channels may be determined as a result of channel contention and/or CCA procedures after which the scanning device has the knowledge as to which channels it has gained access to transmit. If the determined number of channels is one, the scanning device may transmit the probe request message on the determined channel. If the scanning device gains access to only one channel, e.g. the primary channel, it is feasible to transmit a scanning request message of an earlier protocol version to solicit a probably higher number of responding devices to respond. On the other hand, if the determined number of channels is more than one, the scanning device may transmit simultaneously said FILS request messages on different channels. In this case, the scanning device may additionally transmit a probe request message on the primary channel.

Figure 8:
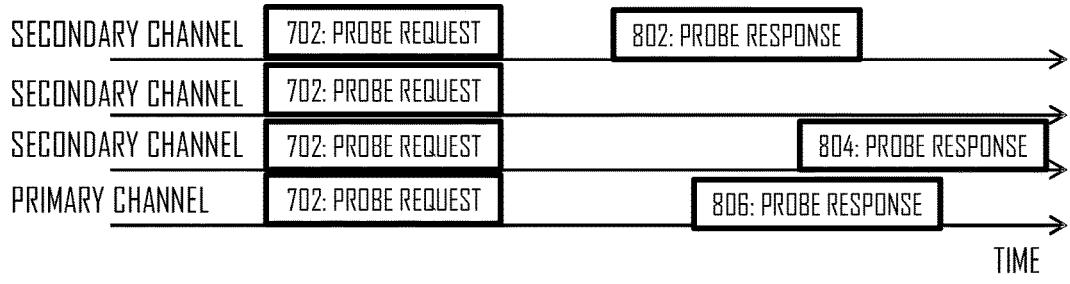

In yet another embodiment, the scanning device is configured to use the probe request messages in the duplicate transmission of the scanning request message instead of using a logically new type of scanning request message. The probe request message may be the Probe Request of IEEE 802.11 networks or a corresponding conventional scanning request message. In this embodiment illustrated in FIG. 8, the scanning device is configured to transmit a plurality of copies of the probe request message 702 as the duplicate transmission such that the copies of the probe request message are transmitted simultaneously on different channels. As the conventional configuration is such that the probe request is transmitted only on the primary channel, the responding devices may be configured to transmit the probe response message only on their primary channels. The responding devices having different primary channels may thus transmit their probe response messages 802, 804, 806 such that the transmissions overlap at least partly in the time domain, as shown in FIG. 8. In some embodiments, the scanning device may be able to receive correctly all the probe response messages 802 to 806. In other embodiments, however, the scanning device is able to receive a frame on one channel at a time or only on its primary channel of transmission, e.g. only the probe response message 806 may be detected correctly. In such embodiments, the scanning device may take advantage of the other probe response messages 802, 804 by detecting in a CCA procedure that respective channels of the probe response messages 802, 804 contain radio energy during the transmission of the probe response messages 802, 804. The scanning device may thus deduce that they are primary channels of wireless networks and redo the active scanning on those channels by transmitting another probe request message 702 on those channels.

Figure 9:
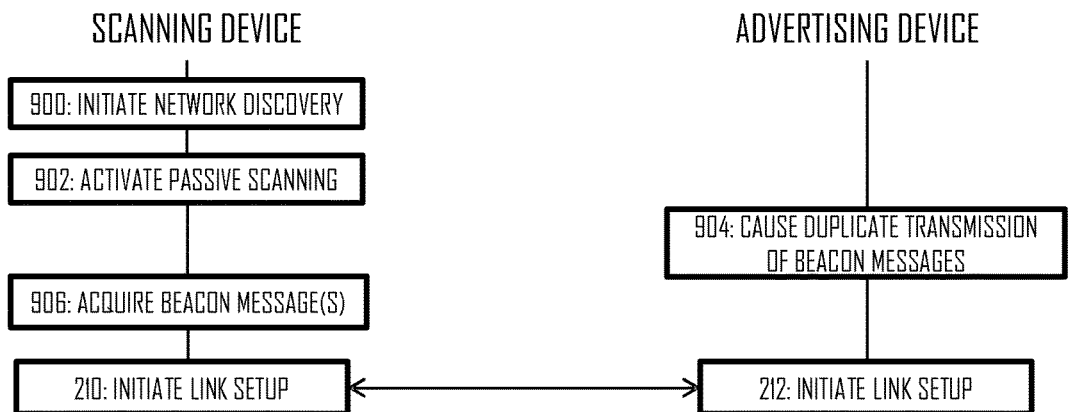
FIG. 9 illustrates a signalling diagram related to duplicate transmission of unsolicited scanning messages according to an embodiment of the invention.
Figure 10:
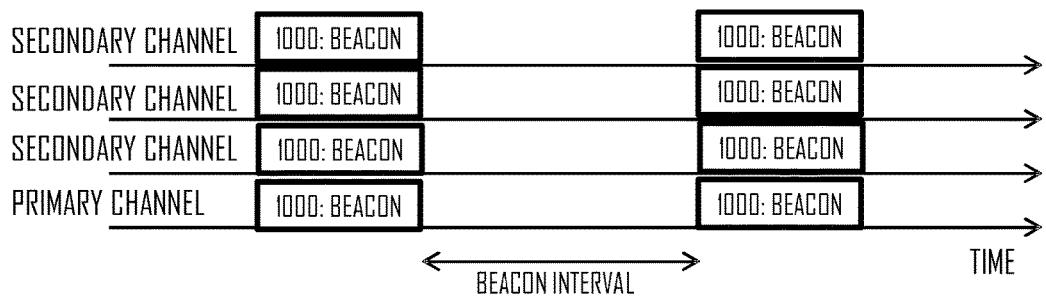
FIGS. 10 and 11 illustrate embodiments for triggering the duplicate transmission of the unsolicited scanning messages.
Figure 11:
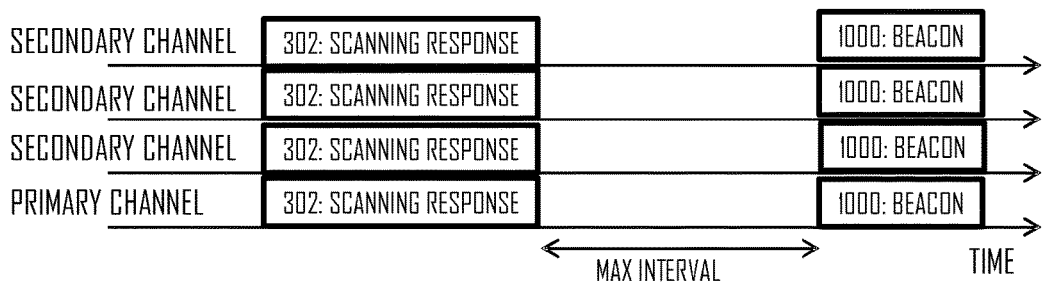

The embodiments described above relate to situations where the scanning device transmits the scanning request messages 300, 700, 702 as the duplicate transmissions while the responding device responds with a single transmission or a duplicate transmission, depending on the embodiment. FIGS. 9 to 11 illustrate embodiments where the scanning device passively acquires scanning messages related to the network discovery. The scanning messages are originated from an advertising device that advertises the presence of its wireless network. The advertising device may be an AP or a STA, and it may be physically the same device as the responding device described in any one of the embodiments above.

FIG. 9 illustrates a signalling diagram of an embodiment where the advertising device transmits the scanning messages as the duplicate transmission during the network discovery procedure of the scanning device. Referring to FIG. 9, the scanning device initiates the network discovery procedure in block 900. The network discovery procedure comprises activating passive scanning of channels in block 902. In block 904, the advertising device is configured to transmit a plurality of copies of a beacon message simultaneously on different channels. The beacon message may be a periodically transmitted beacon frame comprising information on the wireless network of the advertising device. In an embodiment, the beacon message carries the same information or a subset of the information as the beacon frame of an IEEE 802.11 wireless network but is logically different beacon frame. Identifying the beacon frame transmitted by using the duplicate transmission as logically different from the beacon frame transmitted on a single channel only enable scanning devices to distinguish them from one another. Thus, a scanning device not supporting the duplicate-transmitted beacon frames is able to distinguish the beacon frame transmitted by using the single transmission and extract only those beacon frames during the passive scanning. On the other hand, a scanning device supporting the duplicate-transmitted beacon frames is able to distinguish both types of beacon frames and expedite its network discovery procedure.

As described above with respect to the scanning request message and the scanning response message, the advertising device may be configured to insert the plurality of copies of the beacon message as medium access control management packet data units (MMPDUs) into a single physical layer convergence protocol packet data unit (PPDU). As a consequence, the plurality of copies of the beacon message may be understood as being comprised in the same PPDU. Each copy of the beacon message may be considered to form a low-bandwidth MMPDU within a high-bandwidth PPDU. For example, each MMPDU may have a bandwidth of 20 MHz, while the bandwidth of the PPDU may be 80 MHz according to the example of FIGS. 9 and 10. The PPDU may be called the non-VHT duplicate PPDU.

In an embodiment, a PPDU comprising the plurality of copies of the same beacon message is called a non-VHT duplicate beacon frame.

In block 906, the scanning device acquires at least one of the copies of the beacon message and acquires the information on the wireless network of the advertising device. As a consequence, the scanning device and the advertising device may initiate the link setup in block 210 and 212, respectively.

The operation of the scanning device in blocks 900, 902, 906 may be independent of the operation of the advertising device in block 904. As a consequence, the advertising device may transmit the beacon frames periodically or according to another criterion, while the scanning device passively scans for the beacon messages or other management frames.

The transmission of the beacon message as the duplicate transmission also expedites the link setup, as the transmission of multiple copies of the beacon message on parallel channels increases the probability that the scanning device detects at least one of the beacon messages.

FIGS. 10 and 11 illustrate some embodiments of the transmission of the beacon messages. As described above, the beacon message may be transmitted periodically, and FIG. 10 illustrates the periodic transmission. Referring to FIG. 10, the advertising device transmits the plurality of copies of the beacon message 1000 on its primary channel and secondary channels simultaneously. After the duplicate transmission of the beacon message 1000, the advertising device may start a timer counting a beacon interval. After the timer has expired, the advertising device may transmit a subsequent duplicate transmission of the beacon message 1000 on the same channels.

While the embodiment of FIG. 10 computes the time interval only from the previously transmitted beacon message, the embodiment of FIG. 11 expands to scheme to encompass also any other corresponding management frame, e.g. the above-described scanning response message 302 transmitted by the advertising device in the role of the responding device. Referring to FIG. 11, the timer is triggered by a transmission of any one of the scanning response message 302 and the beacon message 1000. The timer may count the maximum time interval allowed to pass between transmissions of management frames related to the network discovery. Upon expiry of the timer, the advertising device is configured to transmit the beacon message or a corresponding unsolicited advertisement frame.

The scanning response message 302 and the beacon message 1000 may comprise parameters of the wireless network, e.g. capability information, supported data rates, and a type of the wireless network. In an embodiment, the scanning response message 302 and the beacon message 1000 comprises corresponding parameters of other wireless networks known to the responding/advertising device. As a consequence, the network discovery may be further expedited by providing information on a plurality of wireless networks in a single message.

The FILS response message and FILS beacon message may contain the same information elements as the Probe Response of IEEE 802.11 networks. Additionally, the Channel number element of Table 1 may be included in the FILS response message and FILS beacon message to indicate the primary channel of the wireless network. In the embodiment where the FILS response message and/or FILS beacon message advertises the neighbouring wireless networks, the FILS response message and/or FILS beacon message may comprise a plurality of channel number elements of Table 1, one for each advertised wireless network. The channel number elements may be distinguished from each other by associating each element to an SSID of the corresponding advertised wireless network.

Figure 12:
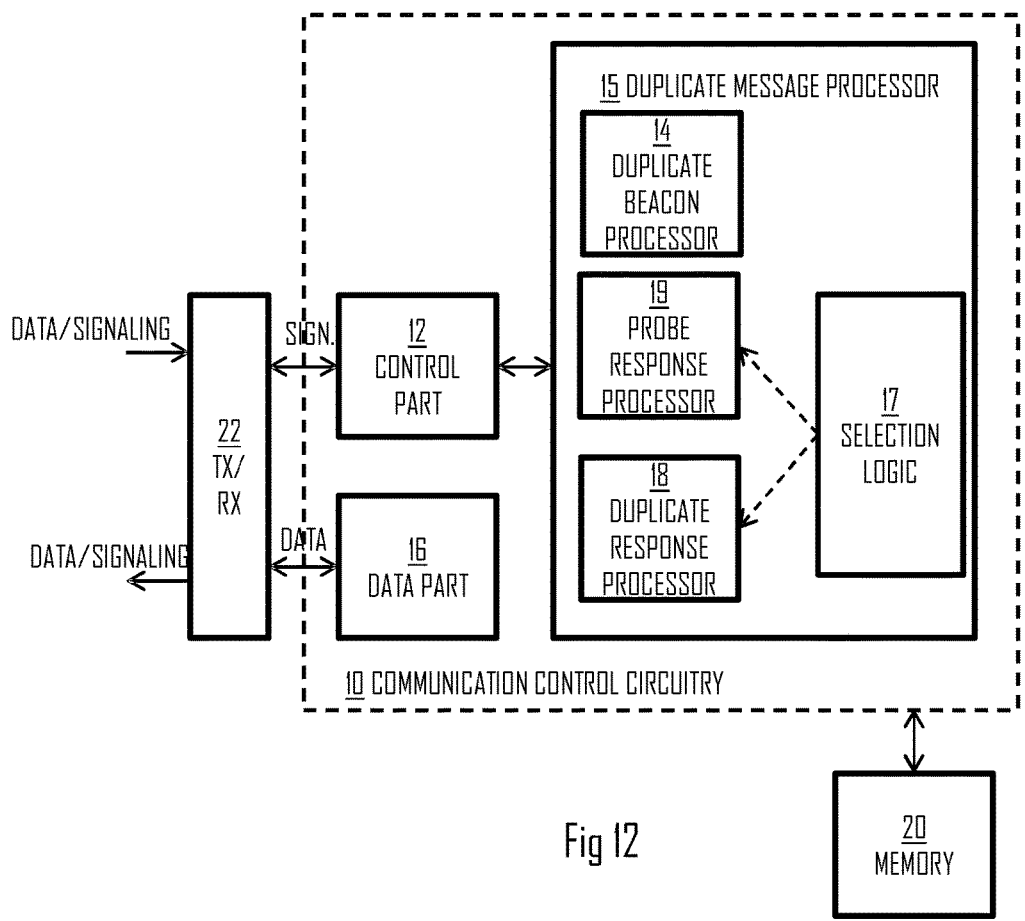
FIGS. 12 and 13 illustrate block diagrams of apparatuses according to some embodiments of the invention.

FIG. 12 illustrates an embodiment of an apparatus comprising means for carrying out the above-mentioned functionalities of the responding/advertising device. As described above, the definitions "responding device" and "advertising device" merely describe the role, and the roles may be realized by the same wireless apparatus. The wireless apparatus may comply with specifications of an IEEE 802.11 network or another wireless network, e.g. it may be an AP or STA. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, a fixed base station operating as the AP, or any other apparatus provided with radio communication capability. In another embodiment, the apparatus carrying out the above-described functionalities of the responding/advertising device is comprised in such a wireless apparatus, e.g. the apparatus may comprise a circuitry, e.g. a chip, a processor, a micro controller, or a combination of such circuitries in the wireless apparatus.

Referring to FIG. 12, the apparatus may comprise a communication controller circuitry 10 configured to control wireless communications in the wireless apparatus. The communication controller circuitry 10 may comprise a control part 14 handling control signalling communication with respect to transmission, reception, and extraction of control or management frames including the scanning request messages, the scanning response messages, and the beacon and advertisement messages, as described above. The communication controller circuitry 10 may further comprise a data part 16 that handles transmission and reception of payload data during transmission opportunities of the wireless apparatus (transmission) or transmission opportunities of other wireless apparatuses (reception). The communication controller circuitry 10 may further comprise a duplicate message processor circuitry 15 configured to manage the duplicate transmissions in the wireless apparatus. The duplicate message processor circuitry 15 may be configured to process the duplicate scanning request messages transferred simultaneously on different channels from the scanning device, and to process the duplicate scanning messages transmitted by the wireless apparatus. For the latter purpose, the duplicate message processor circuitry 15 may comprise a probe response processor circuitry 19 configured to handle the transmission of conventional probe response messages that are transmitted as singular transmissions, a duplicate response processor circuitry 18 configured to handle the duplicate transmission of scanning response messages, e.g. the FILS responses, and a duplicate beacon processor circuitry 14 configured to handle duplicate transmissions of the beacon messages and/or other unsolicited advertisement messages. Additionally, the duplicate message processor circuitry 15 may comprise a selection logic circuitry 17 configured to selectively activate the probe response processor circuitry 19 and the duplicate response processor circuitry 18. The selection logic circuitry 17 may be configured to determine the manner in which to respond to a scanning request message. For example, if the selection logic circuitry 17 determines to transmit only a single copy of the scanning response message, as in the embodiment of FIG. 3, the selection logic circuitry may activate the probe response processor circuitry 19 to transmit the scanning response message. On the other hand, if the selection logic circuitry 17 determines to transmit the scanning response message as the duplicate transmission, it may activate the duplicate response processor circuitry 18 and configure it to transmit the plurality of copies of the scanning response message on the selected channels, as described above in connection with FIGS. 4 to 6. The duplicate beacon processor circuitry 14 may be configured to carry out the duplicate transmission of the beacon or advertisement messages, as described above in connection with FIGS. 10 and 11.

Depending on the embodiment, some of the circuitries 14, 17, 18, 19 may be omitted. For example, if the wireless apparatus applies the duplicate transmission only to the beacon messages, circuitries 17 and 18 may be omitted.

The circuitries 12 to 19 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 19 or all of them.

The apparatus may further comprise the memory 20 that stores computer programs (software) configuring the apparatus to perform the above-described functionalities of the wireless apparatus. The memory 20 may also store communication parameters and other information needed for the wireless communications. The apparatus may further comprise radio interface components 22 providing the apparatus with radio communication capabilities within its wireless network and/or with other wireless networks. The radio interface components 22 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities of the responding device and/or the advertising device according to any one of the processes of FIGS. 2 to 11. Accordingly, the at least one processor, the memory, and the computer program code form processing means for carrying out embodiments of the present invention in the wireless apparatus.

Figure 13:
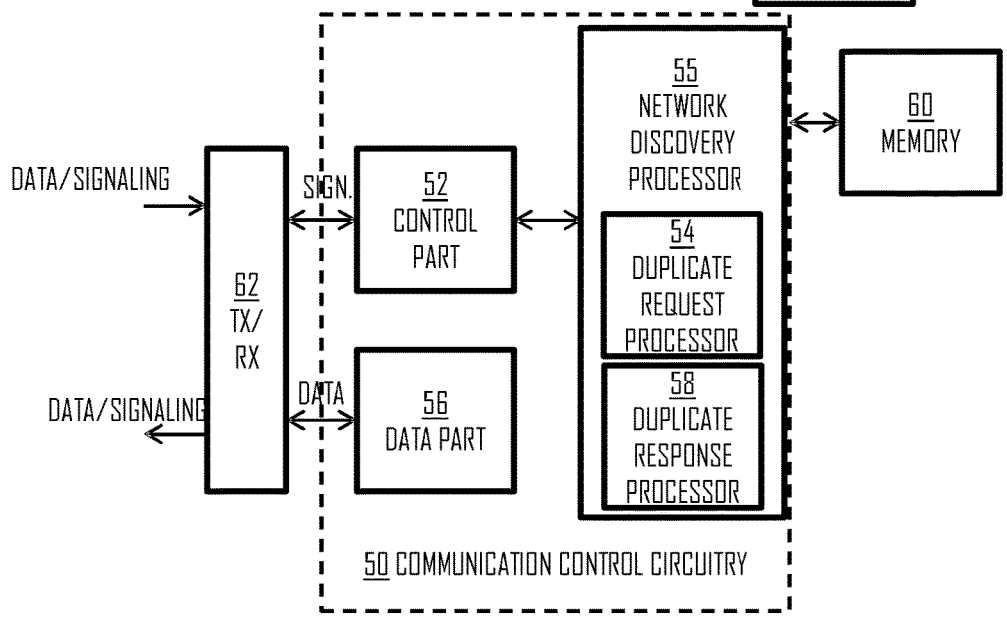

FIG. 13 illustrates an embodiment of an apparatus comprising means for carrying out the above-mentioned functionalities of the scanning device. The scanning device may be a wireless apparatus which complies with specifications of an IEEE 802.11 network or another wireless network, e.g. it may be a STA. The wireless apparatus may also be a cognitive radio apparatus capable of adapting its operation to a changing radio environment, e.g. to changes in parameters of another system on the same frequency band. The wireless apparatus may be or may be comprised in a computer (PC), a laptop, a tablet computer, a cellular phone, a palm computer, or any other apparatus provided with radio communication capability. In another embodiment, the apparatus carrying out the above-described functionalities of the scanning device is comprised in such a wireless apparatus, e.g. the apparatus may comprise a circuitry, e.g. a chip, a processor, a micro controller, or a combination of such circuitries in the wireless apparatus.

Referring to FIG. 13, the apparatus may comprise a communication controller circuitry 50 configured to control wireless communications in the wireless apparatus. The communication controller circuitry 50 may comprise a control part 52 handling control signalling communication with respect to transmission, reception, and extraction of control or management frames including the scanning request messages, the scanning response messages, and the beacon and advertisement messages, as described above. The communication controller circuitry 50 may further comprise a data part 56 that handles transmission and reception of payload data during transmission opportunities of the wireless apparatus (transmission) or transmission opportunities of other wireless apparatuses (reception). The communication controller circuitry 50 may further comprise a network discovery processor circuitry 55 configured to carry out the above-described network discovery procedure comprising the duplicate transmission and/or duplicate reception of the scanning messages. The network discovery processor circuitry 55 may comprise as sub-circuitries a duplicate request processor circuitry 54 configured to carry out the duplicate transmission of the scanning request messages (see FIGS. 3 to 8) and a duplicate response processor circuitry 58 configured to carry out processing of the scanning response messages and/or beacon messages received as the duplicate transmissions. The network discovery processor circuitry 55 may further comprise a probe request processor circuitry and a probe response processor circuitry configured to process the conventional probe request and probe response messages. The operation of the duplicate request processor circuitry 54 and the probe request processor circuitry may be cooperative in the sense that depending on the embodiment or the situation, they both may be configured to transmit the scanning request message (embodiment of FIG. 7) or only one of them may transmit the scanning request message.

In an embodiment, the network discovery processor circuitry 55 is configured to determine the number of channels on which to transmit the scanning request message. If the determined number of channels is one, the network discovery processor circuitry may activate only the probe request processor circuitry to transmit the single transmission of the probe request on the primary channel of transmission. On the other hand, if the determined number of channels is more than one, the network discovery processor circuitry may activate the duplicate request processor circuitry 54 to transmit simultaneously the plurality of copies of the scanning request message on the determined channels.

The circuitries 52 to 58 of the communication controller circuitry 50 may be carried out by the one or more physical circuitries or processors. In practice, the different circuitries may be realized by different computer program modules. Depending on the specifications and the design of the apparatus, the apparatus may comprise some of the circuitries 52 to 58 or all of them.

The apparatus may further comprise the memory 60 that stores computer programs (software) configuring the apparatus to perform the above-described functionalities of the wireless apparatus. The memory 60 may also store communication parameters and other information needed for the wireless communications and in the network discovery procedure. The apparatus may further comprise radio interface components 62 providing the apparatus with radio communication capabilities within its wireless network and/or with other wireless networks. The radio interface components 62 may comprise standard well-known components such as an amplifier, filter, frequency-converter, (de)modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the wireless apparatus comprises at least one processor and at least one memory including a computer program code, wherein the at least one memory and the computer program code are configured, with the at least one processor, to cause the apparatus to carry out the functionalities of the responding device and/or the advertising device according to any one of the processes of FIGS. 2 to 11. Accordingly, the at least one processor, the memory, and the computer program code form processing means for carrying out embodiments of the present invention in the wireless apparatus.

As used in this application, the term 'circuitry' refers to all of the following: (a) hardware-only circuit implementations, such as implementations in only analogue and/or digital circuitry, and (b) to combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) to circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular element, a baseband integrated circuit or applications processor integrated circuit for a mobile phone or a similar integrated circuit in server, a cellular network device, or other network device.

The processes or methods described in FIGS. 2 to 11 may also be carried out in the form of a computer process defined by a computer program. The computer program may be in source code form, object code form, or in some intermediate form, and it may be stored in a transitory or a non-transitory carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to wireless networks defined above but also to other suitable wireless communication systems. The protocols used, the specifications of wireless networks, their network elements and terminals, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
   causing a wireless apparatus of a wireless network to perform a network discovery procedure to query for present apparatus of the wireless network, comprising transmitting a plurality of copies of a scanning request message simultaneously on different channels of the wireless network;
   acquiring, by the wireless apparatus, at least one scanning response message originated from an apparatus of the wireless network in response to the network discovery procedure and transferred on at least one of the channels on which the plurality of copies of the scanning request message were transmitted; and
   initiating a link setup with a wireless network on the basis of the acquired scanning response message.

2. The method of claim 1, wherein a plurality of copies of a scanning response message is acquired, each copy of the scanning response message being transferred on a different channel than the other copies of the scanning response message and simultaneously with the other copies of the scanning response message.

3. The method of claim 1, further comprising causing the wireless apparatus to insert said plurality of copies of the scanning request messages as medium access control management packet data units into a single physical layer convergence protocol packet data unit.

4. The method of claim 1, further comprising:
   determining a primary channel of transmission and at least one secondary channel on the basis of a clear-channel assessment procedure; and
   causing the wireless apparatus to transmit during the network discovery procedure the plurality of copies of the scanning request message simultaneously on the determined primary channel of transmission and on said at least one secondary channel.

5. A non-transitory program storage device readable by a machine, tangibly embodying a program of instructions executable by the machine for performing operations, the operations comprising the method as claimed in claim 1.

6. The method of claim 1, wherein the plurality of copies of the scanning request message are transmitted simultaneously over a whole bandwidth of a primary channel and secondary channels of the wireless network as detected by the wireless apparatus.

7. A method, comprising:
acquiring, in a wireless apparatus of a wireless network, a plurality of copies of a scanning request message for a network discovery procedure to query for present apparatus of the wireless network originated from a requesting apparatus and transferred simultaneously on different channels of the wireless network;
causing the wireless apparatus to transmit a scanning response message to the network discovery procedure on at least one channel as a response to the plurality of copies of the scanning request message; and
based on the scanning response message, establishing a connection between the wireless apparatus and the requesting apparatus after the transmission of the scanning response message.

8. The method of claim 7, further comprising:
determining channels on which the plurality of copies of the scanning request messages were transferred; and
causing the wireless apparatus to transmit a copy of the scanning response message simultaneously on all the channels on which the scanning request messages were transferred.

9. The method of claim 7, further comprising:
causing the wireless apparatus to insert said plurality of copies of the scanning messages as medium access control management packet data units into a single physical layer convergence protocol packet data unit.

10. A non-transitory program storage device readable by a machine, tangibly embodying a program of instructions executable by the machine for performing operations, the operations comprising the method as claimed in claim 7.

11. An apparatus comprising:
at least one processor; and
at least one non-transitory memory including a computer program code, wherein the at least one memory and the computer program code are configured, with the at least one processor, to cause the apparatus to:
cause transmission of a plurality of copies of a scanning request message simultaneously on different channels of a wireless network for a network discovery procedure to query for present apparatus of the wireless network;
acquire, during the network discovery procedure, at least one scanning response message originated from an apparatus in response to the network discovery procedure and transferred on at least one of the channels on which the plurality of copies of the scanning request message were transmitted; and
initiate a link setup with a wireless network on the basis of the acquired scanning response message.

12. The apparatus of claim 11, wherein a plurality of copies of a scanning response message is acquired, each copy of the scanning response message being transferred on a different channel than the other copies of the scanning response message and simultaneously with the other copies of the scanning response message.

13. The apparatus of claim 11, wherein the at least one memory and the computer program code are configured, with the at least one processor, to cause the apparatus to insert said plurality of copies of the scanning request messages as medium access control management packet data units into a single physical layer convergence protocol packet data unit.

14. The apparatus of claim 11, wherein the at least one memory and the computer program code are configured, with the at least one processor, to cause the apparatus to:
determine a primary channel of transmission and at least one secondary channel on the basis of a clear-channel assessment procedure; and
cause transmission of the plurality of copies of the scanning request message simultaneously on the determined primary channel of transmission and on said at least one secondary channel during the network discovery procedure.

15. An apparatus comprising:
at least one processor; and
at least one non-transitory memory including a computer program code, wherein the at least one memory and the computer program code are configured, with the at least one processor, to cause the apparatus to:
acquire a plurality of copies of a scanning request message for a network discovery procedure to query for present apparatus of a wireless network originated from a requesting apparatus and transferred simultaneously on different channels of the wireless network, wherein said scanning request message relates to a network discovery procedure of the requesting apparatus;
cause transmission of a scanning response message on at least one channel as a response to the plurality of copies of the scanning request message; and
based on the scanning response message, establish a connection between the wireless apparatus and the requesting apparatus after the transmission of the scanning response message.

16. The apparatus of claim 15, wherein the at least one memory and the computer program code are configured, with the at least one processor, to cause the apparatus to:
determine channels on which the plurality of copies of the scanning request messages were transferred; and
cause transmission of a copy of the scanning response message simultaneously on all the channels on which the scanning request messages were transferred.

17. The apparatus of claim 15, wherein the at least one memory and the computer program code are configured, with the at least one processor, to cause the apparatus to insert said plurality of copies of the scanning messages as medium access control management packet data units into a single physical layer convergence protocol packet data unit.

* * * * *